United States Patent
Krishna et al.

(10) Patent No.: US 9,223,685 B2
(45) Date of Patent: Dec. 29, 2015

(54) VALIDATING A SPECIFICATION ASSOCIATED WITH A SOFTWARE APPLICATION AND/OR A HARDWARE

(71) Applicant: Tata Consultancy Services Limited, Maharashtra (IN)

(72) Inventors: Goldsmith Murali Krishna, Pune (IN); Ulka Aniruddha Shrotri, Pune (IN); Venkatesh R, Pune (IN)

(73) Assignee: Tata Consultancy Services Limited, Maharashtra (IN)

( * ) Notice: Subject to any disclaimer, the term of this patent is extended or adjusted under 35 U.S.C. 154(b) by 0 days.

(21) Appl. No.: 14/445,610

(22) Filed: Jul. 29, 2014

(65) Prior Publication Data
US 2015/0033208 A1     Jan. 29, 2015

(30) Foreign Application Priority Data
Jul. 29, 2013   (IN) .......................... 2497/MUM/2013

(51) Int. Cl.
*G06F 9/44*    (2006.01)
*G06F 11/36*   (2006.01)

(52) U.S. Cl.
CPC ........ *G06F 11/3692* (2013.01); *G06F 11/3668* (2013.01); *G06F 11/3684* (2013.01)

(58) Field of Classification Search
USPC ........................................................ 717/126
See application file for complete search history.

(56) References Cited

U.S. PATENT DOCUMENTS

| 4,819,233 A * | 4/1989 | Delucia et al. ................. 717/129 |
| 6,385,765 B1 | 5/2002 | Cleaveland et al. |
| 7,941,438 B2 | 5/2011 | Molina-Moreno et al. |
| 8,019,795 B2 * | 9/2011 | Anderson et al. ............. 707/803 |
| 8,365,138 B2 | 1/2013 | Iborra et al. |
| 2004/0103396 A1 * | 5/2004 | Nehab ........................... 717/127 |
| 2005/0132342 A1 * | 6/2005 | Van Lunteren ............... 717/143 |
| 2007/0266366 A1 * | 11/2007 | Bucuvalas ..................... 717/104 |
| 2009/0150447 A1 * | 6/2009 | Anderson et al. ............. 707/200 |

(Continued)

FOREIGN PATENT DOCUMENTS

JP     2012190203 A    10/2012

OTHER PUBLICATIONS

Ryszard Janicki, "On a Formal Semantics of Tabular Expressions", Science of Computer Programming 39 (2001) pp. 189-213.

(Continued)

*Primary Examiner* — Don Wong
*Assistant Examiner* — Marina Lee
(74) *Attorney, Agent, or Firm* — Hayes Soloway PC

(57) ABSTRACT

System and method for validating a specification associated with a software application and/or a hardware is disclosed. The specification comprising expected behavior requirements specified in a specification language and the semantics in the tabular notation is received. In order to validate the specification, a string may be identified for the specification. The string may indicate characters conforming to the specification language. Upon identifying the string, a token may be generated using the string. The token may be a binary representation of the string. The token may be arranged into a data structure. The specification is checked to conform to the specification language. Two or more specifications specified in the specification language are merged. A test case is generated from the validated specification. The expected behavior with the actual behavior of the specification is validated.

13 Claims, 5 Drawing Sheets

(56) References Cited

U.S. PATENT DOCUMENTS

| | | | |
|---|---|---|---|
| 2010/0088678 A1* | 4/2010 | AlTurki et al. | 717/124 |
| 2015/0033208 A1* | 1/2015 | Krishna et al. | 717/126 |

OTHER PUBLICATIONS

Ruth Abraham, "Evaluating Generalized Tabular Expressions in Software Documentation" McMaster University, by Ruth Francesca Abraham, Feb. 1997.

A. Jefferson Offutt, Yiwei Xiong, Shaoying Liu, "Criteria for generating specification-based tests" 1999, 11 pages.

Ryszard Janicki and Alan Wassyng, "Tabular Expressions and Their Relational Semantics" Fundamenta Informaticae 68 (2005) 1-28, IIOS Press 2005.

Jules Desharnais, Ridha Khedri and Ali Mili, "Representation, Validation and Integration of Scenarios Using Tabular Expressions" 2008, Kluwer Academic Publishers. 42 pages, Printed in the Netherlands.

Valdivino Alexandre De Santiago Júnior, Nandamudi Lankalapalli Vijaykumar, "Generating model-based test cases from natural language requirements for space application software", Springer Science +Business Media, LLC, Jul. 31, 2011.

Christophe Meudec, "Automatic Generation of Software Tests From Formal Specifations" Thesis, Sep. 1997, 211 pages.

Roy Awedikian, "Quality of the design of test cases for automotive software: design platform and testing process", Central Paris, Feb. 2009.

* cited by examiner

VALIDATING A SPECIFICATION ASSOCIATED WITH A SOFTWARE APPLICATION AND/OR A HARDWARE

TECHNICAL FIELD

The present invention relates to a field of specifying requirements for a software application and/or a hardware. More particularly, the present invention relates to a system and method for validating a specification associated with a software application and/or a hardware.

BACKGROUND OF THE INVENTION

Software applications are increasingly becoming critical in modern life. It is important to provide an adequate quality and minimize defects in software applications. Generally, in order to verify the software applications, software application may be tested before its execution. In order to test the software application, several methods have been proposed. Test automation is one of the methods used for software testing. Test automation is used to automate the execution of software tests and to compare actual outcome with predicted outcome of the software test results.

Test automation requires an automated test execution and results verification, termed as an automated test oracle. The automated test oracle is a reliable source used for expected outputs. The automated test oracle may be used to verify test case results that are executed on the software application under test. In order to verify behaviour of the software application, testers may require the test oracle for reliable expected behaviour of the software application. The automated test oracle may provide an output for a given input specified in the software application to verify the actual results generated by the software application.

In general, for automating the test oracle of reactive systems, a specification notation may be used to specify behavioural requirements for the reactive systems. In one example, the reactive system may include an automotive application. In one example, the automotive application may comprise sensors and actuators. The reactive systems may interact with their environment such as via sensors (inputs) and actuators (outputs). The behavioural requirements for the reactive systems are traditionally described using state-based or stream-based paradigms. In the state-based paradigm, the reaction of the automotive application to an input value is described based on current state of the automotive application. In the stream-based paradigm, the reaction of the automotive application is based on the pattern of stream of input values.

After specifying the behavioural requirements, creating test cases that cover the behavioural requirements is a challenging task and verifying the test results manually is tedious. In order to overcome issues presented above, automated test oracles may be used. However, when the automated test oracle is used, the systems/reactive systems require users to specify the behavioural requirements formally. Further, current specification notations are not user friendly while capturing the behavioural requirements and automated test oracles require specification of the behavioural requirements in formal specification notation.

Existing specification notations for automating the test oracles may include Statecharts, SCR, timing diagrams, and I/O Stream-based tables. Statecharts is a graphical state-based notation as disclosed in "Statecharts: A visual formalism for complex systems," Science of Computer Programming, 1987 by D. Harel. The specification notations such as SCR are tabular notations, but are similar to the Statecharts. For sequence oriented specification requirements, the user may have to analyze and convert the specification requirements to state-based form. Further, timing diagram is a graphical and stream-based notation as disclosed in "A graphic language based on timing diagrams," in Proceedings of the 13$^{th}$ Conference on Foundations of Software Technology and Theoretical Computer Science. London, UK, by C. Antoine, B. L. Goff, and J.-E. Pin. Although, timing diagram provides support for stream-based requirements, they are not suitable for state-based requirements. The I/O stream-based tables are stream-based requirements and are also tabular as disclosed in "Behavioural specification of reactive systems using stream-based I/O tables," Software and Systems Modeling, 2011, by J. Thyssen and B. Hummel. However, the I/O Stream-based tables are not suitable for state-based requirements. Therefore, the above techniques result in the specifications that are not feasible to relate to the requirements of the system/reactive system, and the specifications are not relatable to the testers in viewing the requirements.

SUMMARY

This summary is provided to introduce concepts related to systems and methods for validating a specification associated with a software application and/or a hardware and the concepts are further described below in the detailed description. This summary is not intended to identify essential features of the claimed subject matter nor is it intended for use in determining or limiting the scope of the claimed subject matter.

In one implementation, a method for validating a specification associated with a software application and/or a hardware is disclosed. The method comprises receiving the specification comprising expected behaviour requirements in a specification language and semantics in a tabular notation. The expected behaviour requirements indicate a behaviour expected from the software application and/or the hardware. The method further comprises identifying a string comprising one or more from the specification. The string indicates the one or more characters conforming to the specification language. The method further comprises generating a token using the string. The token is a binary representation of the string. The method further comprises arranging the token into a data structure. The data structure is indicative of an actual behaviour of the software application and/or the hardware. The method further comprises checking the specification conforming to the specification language. The specification is checked in order to generate a validated specification. The receiving, the identifying, the arranging, and the checking are performed by a processor using programming instructions stored in a memory. The method further comprises generating a test case from the validated specification. The method further comprises validating the expected behaviour with the actual behaviour of the specification. The method further comprises merging two or more of the specifications specified in the specification language.

In one implementation, a system for validating and evaluating a specification associated with a software application and/or a hardware is disclosed. The system comprises a processor and a memory coupled to the processor. The processor is capable of executing a plurality of modules stored in the memory. The plurality of modules comprises a reception module to receive the specification comprising expected behaviour requirements specified in a specification language and semantics in a tabular notation. The expected behaviour requirements indicate behaviour expected from the software application and/or the hardware. The plurality of modules further comprises a lexer to identify a string comprising one or more characters from the specification. The string indicates the one or more characters conforming to the specification language. The lexer further generates a token using the string. The token is a binary representation of the string. The plurality of modules further comprises a parser to create an intermediate representation of the specification. The parser further arranges the token into a data structure. The data structure is indicative of an actual behaviour of the software application and/or the hardware. The plurality of modules further comprises a checking module to check the specification conforming to the specification language. The plurality of modules further comprises an analyzing module to generate a test case for a row in the validated specification. Further, the analyzing module may validate the expected behaviour with the actual behaviour specified in the specification. Further, the analyzing module merges two or more of the validated specifications specified in the specification language.

In one implementation, a non-transitory computer readable medium embodying a program executable in a computing device for validating a specification associated with a software application and/or a hardware is disclosed. The program comprises a program code for receiving the specification comprising expected behaviour requirements specified in a specification language and semantics in a tabular notation. The expected behaviour requirements indicate a behaviour expected from the software application and/or the hardware. The program further comprises a program code for identifying a string comprising one or more characters from the specification language. The string indicates the one or more characters conforming to the specification language. The program further comprises a program code for generating a token using the string. The token is a binary representation of the string. The program further comprises a program code for arranging the token into a data structure. The data structure is indicative of an actual behaviour of the software application and/or the hardware. The program further comprises a program code for checking the specification conforming to the specification language. The specification is checked in order to generate a validated specification.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to refer like/similar features and components.

DETAILED DESCRIPTION

Figure 1:
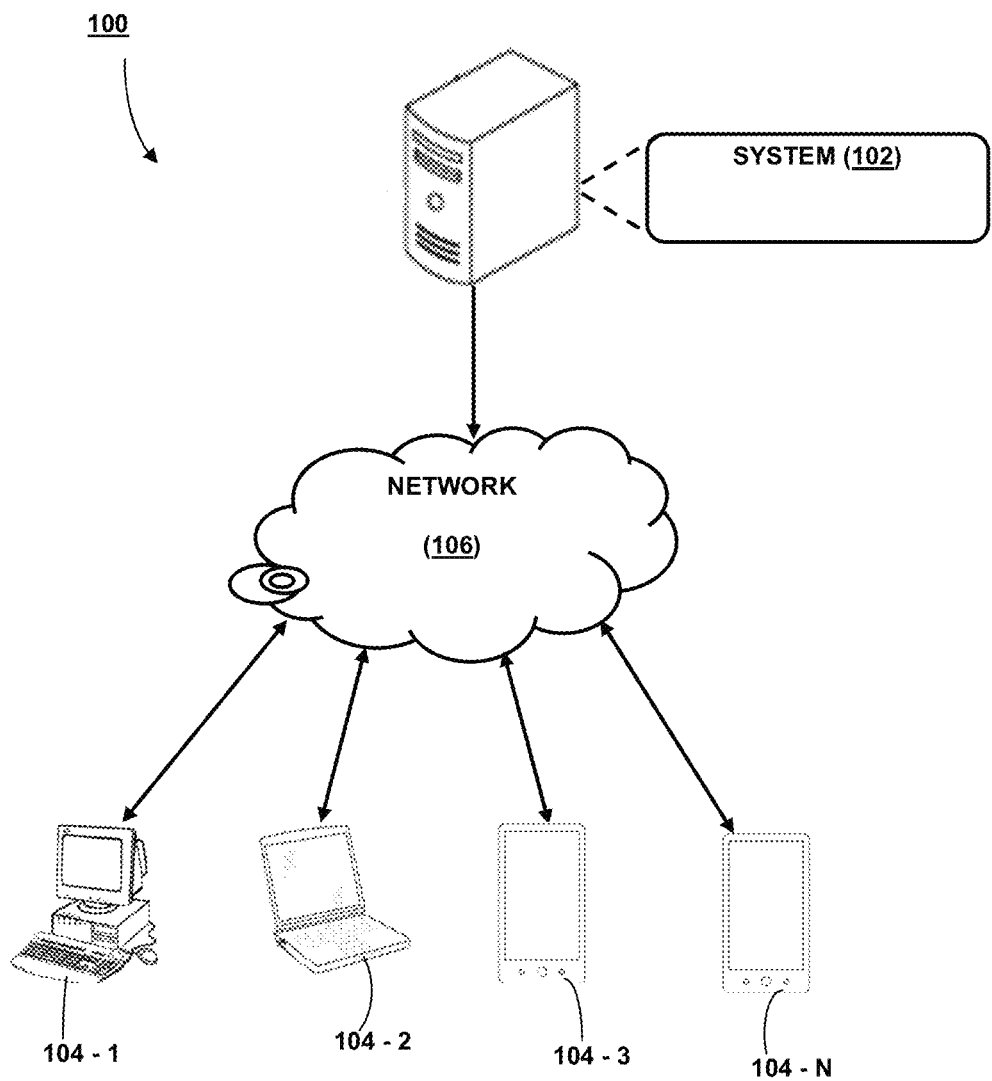
FIG. 1 illustrates a network implementation of a system for validating a specification associated with a software application and/or a hardware, in accordance with an embodiment of the present disclosure.

The present disclosure relates to systems and methods for validating a specification associated with a software application and/or a hardware. The specification may be used to specify expected behaviour requirements for a reactive system. The reactive system may interact with their environment via sensors (inputs) and actuators (outputs). The interactions with their environment are described using a combination of natural language, state-based paradigms, and stream-based paradigms. Examples of the state-based paradigms include state transition tables and stream-based paradigms include timing diagrams. Generally, the specification is specified that follows the specification language to specify the behaviour requirements. The specification may be specified in the specification language in a tabular notation. The specification language may enable translation of the behaviour requirements into a formal specification. The specification may comprise the expected behaviour requirements specified in the specification language and semantics in the tabular notation. The expected behaviour requirements indicate a behaviour expected from the software application and/or the hardware.

The software application and/or the hardware may be an automotive application. In one embodiment, the behaviour requirements of the reactive systems may be described/specified using a state based or a stream based paradigm. In the state based paradigm, behaviour requirements based on reaction of the reactive systems to an event may be described/specified based on current/present state of the reaction system. Further, in the stream based paradigm, behaviour requirements based on reaction of the reactive systems to an event pattern may not be described/specified based on the state of the reaction system.

The specification specified may support/combine the semantics that may be similar to the state based and the stream based paradigm for specifying the requirements. The specification comprising expected behaviour requirements specified in the specification language and the semantics in the tabular notation is received. In order to check the specification conforming to the specification language, a string may be identified from the specification. The string may comprise one or more characters. The string may indicate the one or more characters conforming to the specification language. Upon identifying the string, a token may be generated using the string. The token may be a binary representation of the string. The token may be arranged into a data structure. The data structure may be indicative of an actual behaviour of the software application and/or the hardware. The specification conforming to the specification language may be checked based on the data structure. The specification may be checked in order to generate a validated specification. The validated specification may be used to generate test cases and verify test results. Further, the expected behaviour may be validated with the actual behaviour as specified in the specification. Further, one or more of the specifications specified in the specification language may be merged.

While aspects of described system and method for validating a specification associated with a software application and/or a hardware may be implemented in any number of different computing systems, environments, and/or configurations, the embodiments are described in the context of the following exemplary system.

Referring now to FIG. 1, a network implementation 100 of a system 102 for validating a specification associated with a software application and/or a hardware is illustrated, in accordance with an embodiment of the present disclosure. The system 102 may receive the specification comprising expected behaviour requirements specified in a specification language and semantics in a tabular notation. From the specification received, the system 102 may identify a string. The string may comprise one or more characters from the specification. The string may be indicative of the characters conforming to the specification language. Upon identifying the string, the system 102 may generate a token using the string.

The token generated may be a binary representation of the string. Further, the system 102 may arrange the token into a data structure. The data structure may indicate an actual behaviour of the software application and/or the hardware. The system 102 may check the specification with the specification language.

Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
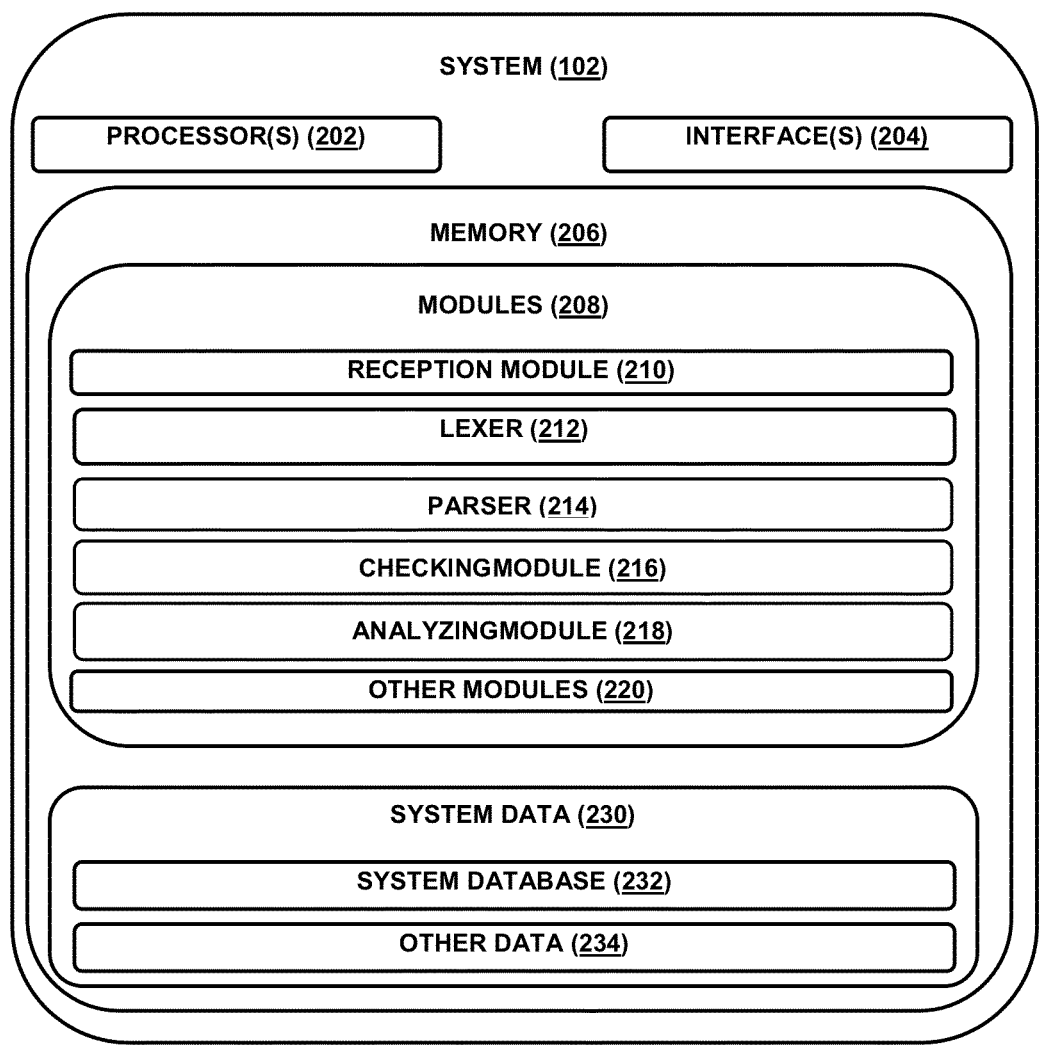
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a reception module 210, a lexer 212, a parser 214, a checking module 216, an analyzing module 218, and other modules 220. The other modules 220 may include programs or coded instructions that supplement applications and functions of the system 102.

The system data 230, amongst other things, serves as a repository for storing data processed, received, and generated by one or more of the modules 208. The system data 230 may also include a system database 232 and other data 234. The other data 234 may include data generated as a result of the execution of one or more modules in the other modules 220.

In one implementation, at first, a user may use the client device 104 to access the system 102 via the I/O interface 204. The working of the system 102 may be explained in detail using FIG. 2, explained below. The system 102 may be used to validate a specification associated with a software application and/or a hardware. In one example, the software application and/or the hardware may comprise an automotive application. In another example, the software application and/or the hardware may comprise an avionic application. In one example, the automotive application may comprise a wiper of a car.

In order to validate the specification associated with the software application and/or the hardware, at first, the system 102 may receive the specification comprising expected behaviour requirements in a specification language and semantics in a tabular notation. In one implementation, the system 102 may employ the reception module 210 to receive the specification. The specification may comprise requirements specified in the specification language (Expressive Decision Table (EDT)). In other words, the specification may indicate behaviour description/requirements and properties of the software application and/or the hardware specified in the specification language. In one example, the specification may specify description/requirements of the behaviour and the properties of the automotive application.

In order to understand the requirements specified for the software application and/or the hardware, an example may be used. In one non-limiting example, the requirements may be specified for a wiper of the car. The requirements for the wiper of the car may be presented as:

1. If the ignition and wiper switch are on and there is no fault in the wiper, then send a a wipe message to the wiper.
2. If wiper is vibrating between park and notpark position, that is, if the wiper is stuck, send a dontwipe message to the wiper. Further, wiper may be considered to be stuck if the wiper switches between park and notpark position thrice within a second.
3. To reset the wiper error, while ignition is on, the wiper switch needs to be switched on and off within half a second.

For the example presented above, the requirements specified at first may be based on a state of ignition and wiper switch that may be defined in a state-based paradigm. Further, the requirements specified at second may be based on a pattern of input values read by a wiper position sensor that may be defined in a stream-based paradigm. Further the requirements specified at third may combine the state of the ignition and the input pattern of the wiper switch that may be based on the state-based and stream-based paradigm.

The specification may be specified for the above example in a tabular notion. The specification may comprise at least one of sequence of input and output events, conditions, and timing constraints. The input and output events and the timing constraints specified in the tabular notation are explained using the example. In one non-limiting example, Table 1 may be used as an example to illustrate the specification specified for the requirements presented above.

TABLE 1

Requirements specified for the automotive application

| sno | in ignition | in wiperswitch | in parksensor | in error | out wipercmd | out error |
|---|---|---|---|---|---|---|
| 1 | on | on | | false | wipe | |
| 2 | | | (park; notpark){=3}{≤1 s} | | dontwipe | true |
| 3 | on | on{≤0.5 s}; off | | true | | false |

Table 1

Table 1 shows the specification of the wiper specified in the specification language in the tabular notation. From the specification, a header of the table specifies the input ports and the output ports. Referring to Table 1, the header of the table may specify four input ports—ignition, wiperswitch, parksensor and error and two output ports wipercmd and error. The port with the name error is an input and output (I/O) port. The Table 1 comprises three row-sequences where the first two row-sequences comprises only one row each and the third has two rows for rows three and four. For the purpose of illustration, the third row is depicted by a sequence number 3. Each requirement presented in the example may be specified in the table as a separate row-sequence and may be interpreted as follows:
 1. If values at ports ignition and wiperswitch are on and the value at error is false then the output wipe at wipercmd port as soon as all inputs arrive.
 2. If park followed by notpark repeats thrice within one second at the parksensor port, the output dontwipe at the wipercmd port and true at the error port.
 3. If the last value for ignition is on, and error is true, and then wiperswitch has value on followed by off within 0.5 seconds, then output false at the error port.

The specification may comprise one or more tables where the headers of the column may specify the input and output ports and the rows may specify a relationship between input and output values. Further, each cell in a row comprises of a regular expression that is used to match input streams at that port. The input values may arrive as a stream at the input ports at discrete time units and the output values may be generated as a stream at the output ports at discrete time units. In one implementation, rules for the regular expression pattern may be described using few examples. In one example, the pattern on matches, if the last value seen is on. In another example, on $\{\le 0.5\ s\}$ matches if the last value seen is on and not more than 0.5 seconds have passed since on was seen. In one embodiment, the regular expressions $<, =, \ge$ and $>$ may be applied. In another example, on $\{\le 0.5\ s\}$; off matches if the last two values are on followed by off and off occurs within 0.5 seconds of on. In another example, (park; notpark)$\{=3\}\{\le 1\ s\}$ matches if the pattern park followed by notpark repeats thrice within 1 second. In another example, an empty cell may match any value if all corresponding cells before it in the row sequence are also empty, otherwise the empty cell may not match with any other cell. For the example as shown in Table 1, in the third row-sequence table, both cells of the parksensor may match any value. Further, in the second row of the table, the cell for ignition may match only if there is no value.

In addition, the first row of any row-sequence matches if each input cell of that row matches. Further, subsequent rows may match when all rows before it match and all its input cells also match. If a row matches, the automotive application may give output values as specified by the patterns of that row's output cells. Further, if a row has matched, if no further inputs arrive at the input ports, the row may continue to match but the output may not be generated.

In one exemplary embodiment, the rules for matching the input and the output considering the example in Table 1 may be presented. For the specification presented in Table 1, consider a set of input strings at the end of four time units as wiperswitch=[on ϵ ϵ ϵ], ignition=[ϵ on ϵ ϵ] and error=[false ϵ ϵ ϵ], where ϵ represents absence of any value at that time. At time 2, row-sequence one matches and the value wipe is output to wipercmd at time 3 and hence its output stream will be [ϵ ϵ wipe ϵ]. Further, the row-sequence continues to match at time 3 and there is no output at time 4. This is because the row-sequence is an extension of the previous match with no further inputs.

In another non-limiting example, consider a second set of input strings at the end of three time units as ignition=[on ϵ ϵ], error=[true ϵ ϵ] and wiperswitch=[ϵ on off]. At time 1, the first row of the row-sequence three matches and at time 3 and the second row matches. For the above consideration, it may be assumed that each time unit may correspond to 100 ms. For the above example, the considerations may result in false being the output to error and the corresponding string may become [true ϵ ϵ false].

In one implementation, syntax and the semantics for the specification specified is explained. At first, the syntax for the specification is explained. Each cell in a table may either be empty or may comprise the pattern expression. In one example, the syntax for the pattern expression may be presented as:

$e := \upsilon | e; e | e \{op\ t\ s\} | e \{op\ n\} | (e)$ where $\upsilon$ is a value ; denotes sequence op $\in \{<, \le, =, \ge, >\}$ t is a floating point constant for time s indicates seconds n is an integer constant for multiplicity The semantics may define consistency of given input strings and output strings for the specification. The specification may employ a discrete unit of time and therefore at any given time t, a string may be present at each port. The string at each port may comprise the values from the port's domain or ϵ. ϵ represents the absence of any value at that time. The semantics of the specification may define which rows of a given table matches the input strings at a given time t. The semantics for the row that are matching may assume that cell matching predicates that are standard regular expression when the pattern-matching predicates. Each value $\upsilon$ in a pattern that may be translated to $\upsilon \cdot \epsilon^*$ and a time expression is translated to an appropriate $\epsilon^n$. The first row of the row-sequence may be matched if all the cells of the cells are matched. Further, the subsequent rows are matched if all previous rows match and the current row also matches. The matching of the row at time t may be defined as:

$$m_r(r_i^j, t) \equiv \begin{cases} m_r(r_i^j, t) & \text{if } j = 1 \\ m_r^*(r_i^j, t) & \text{otherwise} \end{cases}$$

$$m_r^1(r_i^j, t) \equiv \forall c \cdot m^x(s_c^t, e_c^{ij}) \bigvee \phi(c)$$

$$m_r^*(r_i^j, t) \equiv \exists t_1 < t \cdot m_r(r_i^{j-1}, t_1) \wedge \forall c \cdot \phi^-(c) \bigvee$$

$$\exists t_2 \cdot t_1 < t_2 \leq t \wedge m(s_c^{t_2 \rightarrow j}, e_c^{ij}) \wedge s_c^{t_1 \rightarrow t_2-1} = \varepsilon^* \wedge \exists c_1 \cdot t_2 = t_1 + 1$$

Where—

$m_r(r, t)$ is a predicate that is true if row r matches at time t.
$r_i^j$ is the $j^{th}$ row of the row-sequence i
$c, c_1$ are columns
$e_c^{i,j}$ is the pattern expression of row-sequence I, row j and column c
$m^x(s, e)$ is a predicate that checks if a suffix of string s matches the regular expression e
m (s, e) is a predicate that checks if the complete string s matches the regular expression e
$s_c^t$ is the string corresponding to column c at time t
$s_c^{t1 \rightarrow t2}$ is the sub-string from $t_1$ to $t_2$ for column c
$\phi(c)$ checks for emptiness of a cell
$\phi^-(c)$ checks for emptiness of that cell and all corresponding cells in previous rows of the same row-sequence The output of a row may be triggered every time a row matches, that is, either the row did not match at the previous time unit or there may be a non-ε value that may have caused the row to match. The row may be formalized by predicating o(r, t) which may be true if the row r triggers an output at time t.

$$o(r,t) \equiv m_r(r;t) \wedge$$

$$(\neg m_r(r;t-1) \vee \exists c \cdot \neg \phi(c) \wedge \upsilon(c,t) \neq \epsilon)$$

Where $\upsilon(c, t)$ is the value present at time t in the input string for column c.

Further, in case of multiple rows are output-enabled at the same time, the outputs of each such row may be triggered. For such cases, in case of a conflict in the outputs, it may be considered that there is an error in the specification.

From the specification, the strings defined in the specification may be identified. The strings may include the input strings and the output strings. The strings may comprise one or more characters. For the example presented in Table 1, the input strings wiperswitch may comprise one or more characters. Similarly, the cells comprising the requirement on may indicate the characters of the strings. For the specification received, the strings may indicate the one or more characters conforming to the specification language. In one implementation, the lexer 212 may analyse the syntax of the specification specified in the specification language. Further, the lexer 212 may also check to see that all input has been provided that is necessary. In one implementation, the lexer 212 may issue/provide an error if the strings that are defined in the specification are not conforming to the specification language.

Based on the string identified, the lexer 212 may generate a token. The token may be a binary representation of the string. For example, for the string on, the lexer may generate the token as "IDENTIFIER/wiperswitch ("on") END_OF_STREAM", where the wiperswitch is the token recognized as the identifier and on may be recognized as the strings comprising the characters. Similarly, the tokens may be generated for the strings in the specification.

Upon generating the tokens, the tokens may be arranged/converted into a data structure. In one implementation, the system 102 may employ the parser 214 to arrange the token into the data structure. The token may be parsed to identify a syntactical structure of the specification. In order to identify the syntactical structure of the specification, the parser 214 may generate a parse tree. The parser 214 may replace the tokens with the parse tree/tree structure that may be generated using the specification defined in the specification language. The parse tree may be presented using techniques known in the art. Upon replacing the tokens with the parse tree, the data structure may be obtained. The data structure obtained may indicate an actual behaviour of the software application and/or the hardware. Although the implementation of the system 102 is explained using the lexer 212 and the parser 214 for generating the token and creating the parse tree respectively, it may be obvious to persons skilled in the art to use known compilers or any other techniques and such implementation is within the scope of the present disclosure.

The specification received may be checked with the specification language in order to find whether the specification conforms to the specification language. The specification specified using the syntax and the semantics may be checked for the specification language consistency. Upon checking the specification conforming to the specification language, the specification may be termed as a validated specification. In one implementation, the specification conforming to the specification language may be checked by the checking module 216.

After obtaining the validated specification, the specification may be used for generating a test case. In one implementation, the system 102 may employ the analyzing module 218 to generate the test case. For generating the test case, one or more rows from the specification may be used. In order to understand the test case generation, Table 2 may be used as an example. In one non-limiting example, Table 2 illustrates a test case generated from the specification.

TABLE 2

Table 2: Test case generation

| At The Start(Before state) | Time | Inputs | Output |
|---|---|---|---|
| Ign = off; wiperreq=off | 10 s | Ign = on | |
| | 15 s | wiperreq = on | |
| | 16 s | | wipercmd=on |

As shown in Table 2, the input and the output values for the test case e.g for the automotive application may be generated. At first, the analyzing module 218 may check the input constraints specified in the requirements and may generate corresponding input values for the test case. Further, the corresponding output form the test case may be generated considering the output constraints specified in the specification, for example, if the ignition is on for time 10 s, wiperswitch is on at 15 s, then wipercmd is on at 16 s. In other words, the test case may be generated based on the combination of input and constraints specified in the specification to test the behaviour of the application.

In one implementation, a test case result may represent the actual behaviour of the specification e.g the automotive application. The test case result may be used to check for inconsistencies between the specification and the automotive application. If the automotive application does not behave as per the specification, it may mean that either the specification is not defined effectively or the automotive application is behaving erroneously. Therefore, the test case result may be used to check consistency between the specification and the actual behaviour of the automotive application, by validating the test case result with the requirements specified in the specification. In one implementation, the system 102 may employ the analyzing module 218 to check for inconsistencies between the specification and the automotive application.

Figure 3A:
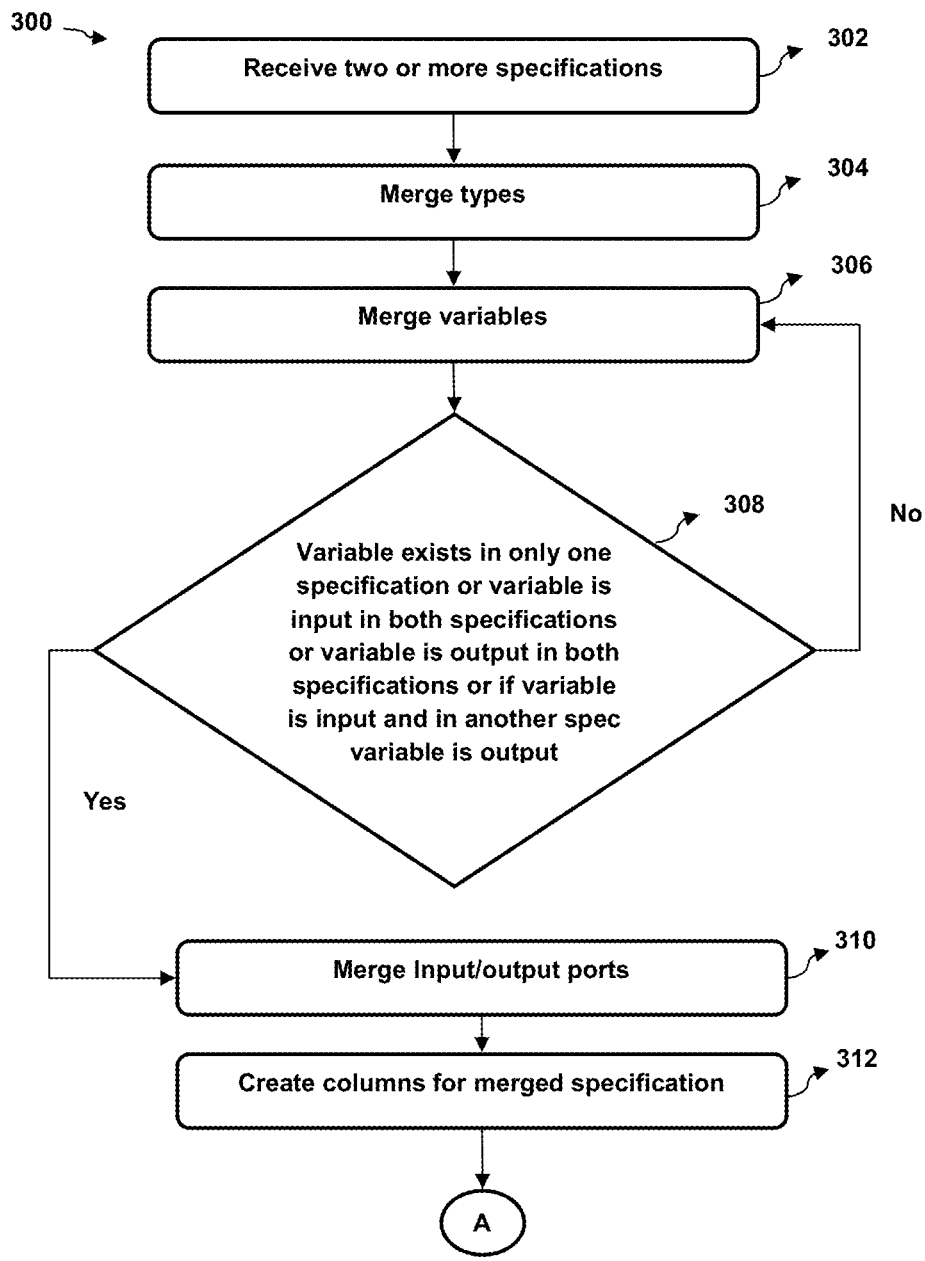
FIG. 3A and FIG. 3B illustrate a method for merging two or more specifications, in accordance with an embodiment of the present disclosure.
Figure 3B:
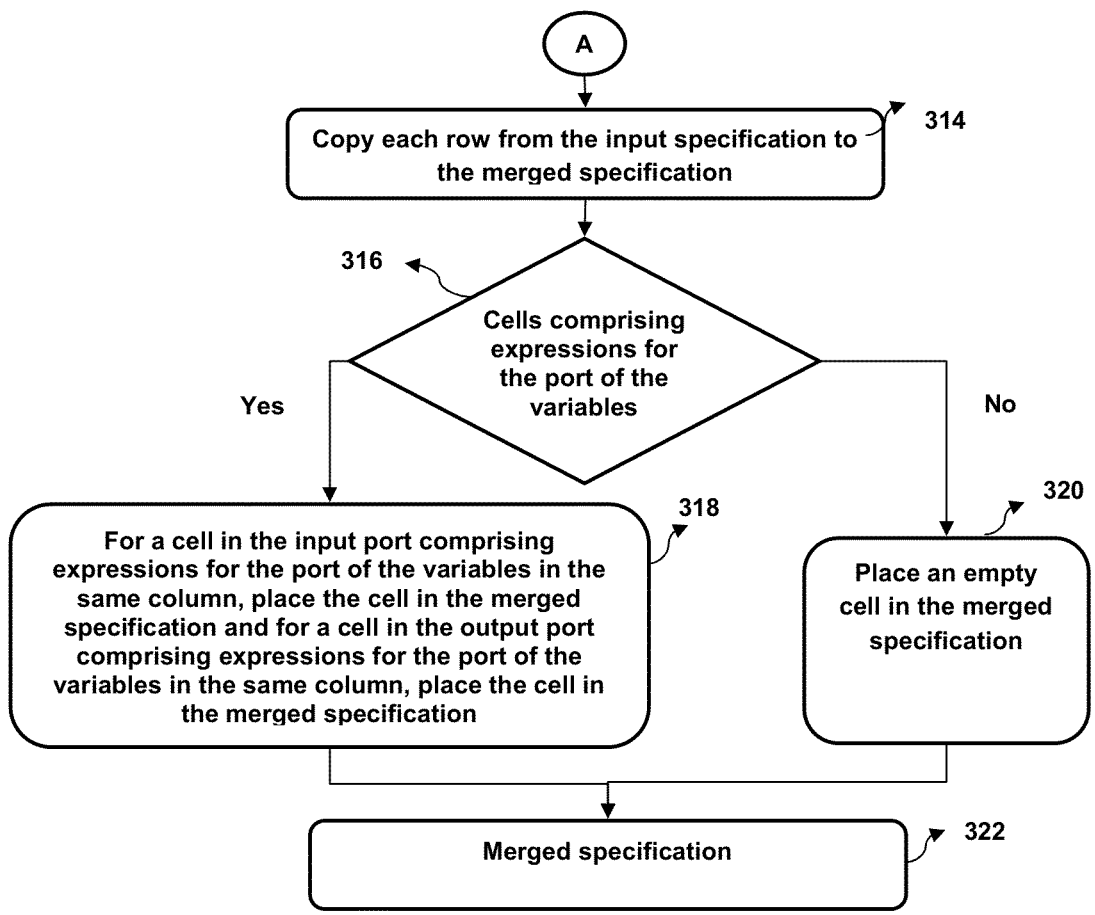

In one implementation, the analyzing module 218 may merge two or more specifications. Referring to FIG. 3A and FIG. 3B, a method 300 for merging the two or more specifications is illustrated. Further, Tables 3, 4 and 5 may be used as examples to illustrate merging of two or more specifications.

At step/block 302, the analyzing module 218 may receive two or more specifications as shown in Table 3 and Table 4. In one example, the Table 3 shows a first specification specifying behaviour requirements. Similarly, Table 4 shows a second specification specifying behaviour requirements.

TABLE 3

Table 3: First specification

| sno | in ABC | in LMN | out XYZ | out TF |
|---|---|---|---|---|
| 1 | a | l | x | true |
| 2 | b | m | | false |

TABLE 4

Table 4: Second specification

| sno | in ABC | In TF | out QRS | out TF |
|---|---|---|---|---|
| 1 | a | | q | |
| 2 | c | false | | true |

At step/block 304, types of the specifications may be merged. At step/block 306, variables in the first and the second specification may be merged.

At decision step/block 308, existence of the variable in any of the specifications may be checked. If the variable is present, then the specification may be taken for merging. Further, if the variable is an input in both of the specifications may be checked. If the variable is input in both of the specifications, the variable is taken as an input in the merged specification. Further, if the variable is an output in both of the specifications may be checked. If the variable is output in both of the specifications, the variable is taken as an output in the merged specification. Further, if the variable is input in one specification and output in another specification, then the variable is input-output port in the merged specification.

At step/block 310, the input/output (I/O) ports may be merged based on the step/block 308.

At step/block 312, columns may be created for the merged specification. The columns may be created based on the I/O ports of the merged specification.

At step/block 314, each row from the first and the second specification may be copied/replicated to the merged specification.

At decision step/block 318, for the cells in the row of the first and second specification, cells comprising expressions for the port of the variables may be used for merging the specification.

At step/block 318, if the cell comprises expressions for the port of the variables at the input port, the cell may be placed in the merged specification under the column, i.e. input port that may exist in the merged specification. Similarly, for a cell comprises expressions for the port of the variables at the output port in the same column i.e. output port, the cell may be placed under the output column in the merged specification. The step 318 may be repeated until all of the cells are copied in the merged specification.

At step/block 320, if the cell in the input port or in the output port does not comprise a value under their respective ports, then an empty cell may be placed in the merged specification.

At step/block 322, the merged specification, upon completion of copying/replicating all the rows for the specifications received, the analyzing module 218 may present the merged specification to the user. For the example shown in Table 3 and Table 4, the merged specification may be illustrated in Table 5. Although merging of the two specifications is illustrated, it is obvious to persons skilled in the art to merge more than two specifications.

TABLE 5

Merged specification

| sno | in ABC | in LMN | in TF | out XYZ | out QRS | out TF |
|---|---|---|---|---|---|---|
| 1 | a | l | | x | | true |
| 2 | b | m | | | | false |
| 3 | a | | | | q | |
| 4 | c | | false | | | true |

Table 5

Figure 4:
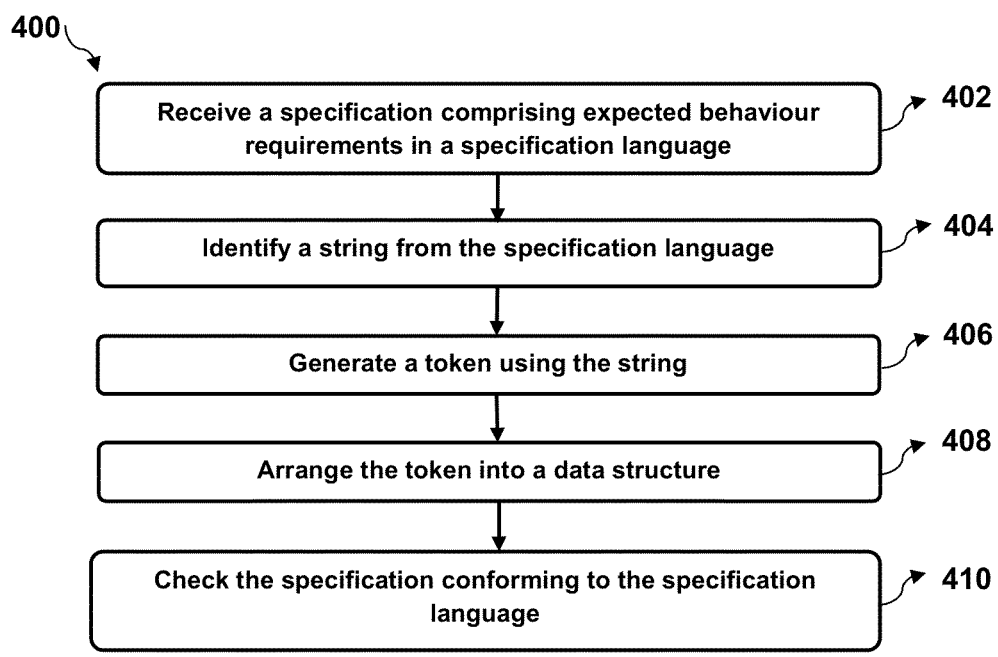
FIG. 4 illustrates a method for validating a specification associated with a software application and/or a hardware, in accordance with an embodiment of the present disclosure.

Referring now to FIG. 4, a method 400 for validating a specification associated with a software application and/or a hardware is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described and is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method may be implemented in any suitable hardware, software, firmware, or combination thereof. However, for ease of explanation, in the embodiments described below, the method 400 may be implemented in the above-described system 102.

At step/block 402, the specification comprising expected behaviour requirements specified in a specification language and semantics in a tabular notation may be received. The expected behaviour requirements indicate a behaviour expected from the software application and/or the hardware. In one implementation, the specification may be received by the reception module 210.

At step/block 404, a string comprising one or more characters may be identified form the specification. The string may indicate the one or more characters conforming to the specification language. In one implementation, the string may be identified by the lexer 212.

At step/block 406, a token may be generated using the string. The token may be a binary representation of the string. In one implementation, the token may be generated by the lexer 212.

At step/block 408, the token may be arranged into a data structure. The data structure may indicate an actual behaviour of the software application and/or the hardware. In one implementation, the token may be arranged by the parser 216.

At step/block 410, the specification conforming to the specification language may be checked. The specification may be checked in order to generate a validated specification. In one implementation, the specification may be checked by the checking module 218.

Although implementations of system and method for validating a specification associated with a software application and/or a hardware have been described in language specific to structural features and/or methods, it is to be understood that the appended claims are not necessarily limited to the specific features or methods described. Rather, the specific features and methods are disclosed as examples of implementations for validating a specification.

We claim:

1. A method for validating a specification associated with a software application and/or a hardware, the method comprising:
   receiving, by a processor, the specification comprising expected behaviour requirements specified in a specification language and semantics in a tabular notation, wherein the expected behaviour requirements indicate a behaviour expected from the software application and/or the hardware;
   identifying, by the processor, a string comprising one or more characters from the specification, wherein the string indicates the one or more characters conforming to the specification language;
   generating, by the processor, a token using the string, wherein the token is a binary representation of the string;
   arranging, by the processor, the token into a data structure, wherein the data structure is indicative of an actual behaviour of the software application and/or the hardware; and
   checking, by the processor, the specification conforming to the specification language, wherein the specification is checked in order to generate a validated specification.

2. The method of claim 1, further comprising generating an intermediate representation of the specification subsequent to generating the token.

3. The method of claim 1, wherein the expected behavioural requirements comprises at least one of sequence of input and output events, conditions, and timing constraints.

4. The method of claim 1, further comprising generating a test case from the validated specification.

5. The method of claim 4, wherein the test case is generated for a row in the validated specification.

6. The method of claim 4, further comprising validating the expected behaviour with the actual behaviour of the specification.

7. The method of claim 1, further comprising merging two or more of the specifications specified in the specification language.

8. A system for validating and evaluating a specification associated with a software application and/or a hardware, the system comprising:
   a processor;
   a memory coupled to the processor, wherein the processor is capable of executing a plurality of modules stored in the memory, and wherein the plurality of modules comprising:
   a reception module to receive the specification comprising expected behaviour requirements specified in a specification language and semantics in a tabular notation, wherein the expected behaviour requirements indicate a behaviour expected from the software application and/or the hardware;
   a lexer to:
      identify a string comprising one or more characters from the specification, wherein the string indicates the one or more characters conforming to the specification language;
      generate a token using the string, wherein the token is a binary representation of the string;
   a parser to:
      create an intermediate representation of the specification language based on the token;
      arrange the intermediate representation into a data structure, wherein the data structure is indicative of an actual behaviour of the software application and/or the hardware; and
   a checking module to check the specification conforming to the specification language in order to generate a validated specification.

9. The system of claim 8, further comprises an analyzing module to analyze the validated specification to perform one or more operations using the intermediate representation of the validated specification.

10. The system of claim 8, wherein the analyzing module further generates a test case for a row in the tabular notation of the validated specification.

11. The system of claim 8, wherein the analyzing module further merges two or more of the validated specifications specified in the specification language.

12. The system of claim 8, wherein the expected behavioural requirements comprises at least one of sequence of input and output events, conditions, timing constraints.

13. A non-transitory computer readable medium embodying a program executable in a computing device for validating a specification associated with a software application and/or a hardware, the program comprising:
   a program code for receiving the specification comprising expected behaviour requirements specified in a specification language and semantics in a tabular notation, wherein the expected behaviour requirements indicate a behaviour expected from the software application and/or the hardware;
   a program code for identifying a string comprising one or more characters from the specification, wherein the string indicates the one or more characters conforming to the specification language;
   a program code for generating a token using the string, wherein the token is a binary representation of the string;
   a program code for arranging the token into a data structure, wherein the data structure is indicative of an actual behaviour of the software application and/or the hardware; and
   a program code for checking the specification conforming to the specification language, wherein the specification is checked in order to generate a validated specification.

* * * * *